United States Patent [19]

Thorley

[11] Patent Number: 4,479,753

[45] Date of Patent: Oct. 30, 1984

[54] WHEELCHAIR LIFT FOR PASSENGER VEHICLES

[75] Inventor: Graham R. Thorley, La Mesa, Calif.

[73] Assignee: Transportation Design & Technology, Inc., San Diego, Calif.

[21] Appl. No.: 379,526

[22] Filed: May 19, 1982

[51] Int. Cl.[3] .......... B60P 1/44

[52] U.S. Cl. .......... 414/541; 414/921; 187/9 R

[58] Field of Search .......... 414/540, 541, 545, 921; 280/166; 187/9 R; 14/69.5, 71.3

[56] References Cited

U.S. PATENT DOCUMENTS

| | | | |
|---|---|---|---|
| 2,498,161 | 2/1950 | Hamilton | 414/545 |
| 3,174,634 | 4/1965 | Peck | 414/540 X |
| 3,516,559 | 6/1970 | Walter | 414/541 |
| 3,613,917 | 10/1971 | Fowler, Jr. | 414/540 |
| 3,651,965 | 3/1972 | Simonelli et al. | 414/545 |
| 3,710,962 | 1/1973 | Fowler, Jr. | 414/545 |
| 3,847,292 | 11/1974 | Williams et al. | 414/541 |
| 3,874,527 | 4/1975 | Royce | 414/537 |
| 4,078,678 | 4/1978 | Tordella | 14/69.5 X |
| 4,081,091 | 4/1978 | Thorley | 414/545 |
| 4,096,955 | 6/1978 | Dake | 414/541 |
| 4,124,097 | 11/1978 | Hawks et al. | 414/540 X |
| 4,133,437 | 1/1979 | Gates | 414/540 |
| 4,180,366 | 12/1979 | Roth et al. | 414/541 |
| 4,278,389 | 7/1981 | Konkle | 414/540 |
| 4,281,744 | 8/1981 | Koerber | 414/540 X |

FOREIGN PATENT DOCUMENTS

| | | | |
|---|---|---|---|
| 2743150 | 4/1979 | Fed. Rep. of Germany | 414/541 |
| 2055344 | 3/1981 | United Kingdom | 414/540 |

*Primary Examiner*—Joseph E. Valenza
*Assistant Examiner*—Stuart Millman
*Attorney, Agent, or Firm*—Charmasson & Holz

[57] ABSTRACT

A lift is provided characterized by its ability to be simply retrofitted into a van or similar vehicle of virtually any style construction without requiring the modification of the existing structure. The unit comes in a small, neat package which is hinged on a vertical axis to a door post adjacent the hinge of one of the doors. The mounting plate of the unit which mounts the hinge also mounts a slide in its distal end which slides in a track in the door, so that as the door is opened the mounting plate is supported at one end by its hinge and at the other end in the slide. A horizontal carrier slides outwardly on tracks on the mounting plate, so that the unit clears the vehicle structure, and then a vertical carrier descends from the horizontal carrier by virtue of a hydraulic actuator. A folding platform then swings down on its horizontal hinge along the lower edge of the vertical carrier, and the various extensions and safety flaps necessary for proper operation are then deployed from within the platform structure. In its deployed mode, the platform is vertically moved on the vertical carrier, and is subsequently stowed by drawing the collateral structure into the platform, swinging the platform from its horizontal position up vertically against the horizontal and vertical carriers, with the carrier being telescoped so that all three units define a small package which can slide inwardly on the mounting plate permitting the door to close, so that the entire lift package, when not deployed, is neatly stowed in a relatively small space in the interior of the van.

8 Claims, 20 Drawing Figures

WHEELCHAIR LIFT FOR PASSENGER VEHICLES

BACKGROUND OF THE INVENTION

The invention is in the field of wheelchair lifts for vehicles and is one of a series of lifts and closely related mechanisms patented or pending which have been applied for by the instant inventor, alone or with co-inventors working for the corporation to which this invention is assigned. These patents and applications include U.S. Pat. Nos. 4,081,091 issued Mar. 28, 1978; 4,027,807 issued June 7, 1977; 4,176,999 issued Dec. 4, 1979; 4,251,179 issued Feb. 17, 1981; pending application Ser. No. 06/268,466, which is a continuation-in-part of a patent cooperation treaty application which was in turn a continuation-in-part of U.S. Pat. No. 4,251,179. In addition, an application has just been filed on an auxiliary step for the two-step steplift of the type described in the above-referenced patents and patent applications.

The above-referenced applications and patents generally pertained to stair structure which could be extended into a horizontal platform which moved vertically between curb level and the floor level of a passenger bus to lift and lower wheelchairs. These units are mounted in either large or small commercial buses. The last mentioned patent application for an auxiliary step adapted the basic commercial bus steplift for use in applications such as on railroad and trolley cars wherein two steps were not enough to reach from the vehicle floor to the surrounding platform area when the unit was deployed as a stair.

The thrust of the instant invention is somewhat different than those mentioned above. Rather than representing a lift characterized by its ability to easily and simply define a stairway when not used as a lift, the instant lift does not define a stairway, but instead is adapted for use in a common van rather than a commercial bus.

The design criteria for a van-mounted unit are, that the unit be as compact as possible when not deployed, that it be very easily deployed, and that it be inexpensively and easily mounted on an existing van without requiring involved structural changes to the van. There are lifts for vans available, but typically they are characterized either by occupying a large space within the van even when not in use, or requiring considerable cutting and reshaping of the van, or both of these inconveniences may occur in the same unit.

The objects of this invention are precisely those stated as the design criteria for a good van-mounted lift. That is, that it be easily and economically mounted as a retrofit item on an existing van, that it be very compact when not in use, that it be easily deployed for use, and of course, that it be rugged and safe in operation.

Although the central thrust of the invention is for implementation in vans, the lift is by no means limited to vans. It would be equally useful in a motor home, or in a trailer; even if the trailer were parked and used as a home in a trailer park. In this last mentioned implementation, the lift would not only be useful for lifting wheelchair victims between ground level and trailer level, but could also be used to lift food and supplies to the level of the trailer floor.

SUMMARY OF THE INVENTION

In order to accomplish the above-stated goals, the invention comes in a small, rectangular package which is vertically hinged adjacent one of the hinges of an existing vehicle door, so that both the door and the lift are hinged to the same door post. The door which is used could be either a rear door or a side door. The only modification to the vehicle involves the welding of several gussets to the door post to define the fixed half of a hinge. The other half of the hinge is defined by a mounting plate, which is supported at the one end by the hinge and at the other edge by a rider which rides in a horizontal slot also retrofitted into the vehicle door which cooperates with the lift.

Thus, as the door is opened, the lift swings out with the door, as it is mounted on the mounting plate which rides in the horizontal slot in the door.

Once the door is opened and the lift package is partially deployed by virtue of being swung out with the door, a horizontal carrier slidably mounted on the mounting plate slides horizontally away from the vehicle until there is vertical clearance beneath the main package of the lift. A vertical carrier vertically slidably telescoping within the horizontal carrier depends to supply the up and down motion of the platform. At the bottom of the vertical carrier a horizontal hinge supports the platform, which is upright in the deployed mode and must be swung down into the horizontal position to use as a lift. Once the platform is horizontal, it can be moved up and down by the vertical carrier, and at the same time, or before the vertical motion starts, a sliding platform extension protrudes from the edge of the platform away from the vehicle, and suitable ramp and flap means are deployed which act as barriers and connector ramps, as needed, during the operation of the lift.

Reversing the above operation, when stowing the lift, the platform extension is withdrawn beneath the platform panel, with the flap and ramp being folded over the top of the platform panel. The panel with its pertinent structure is then pivoted upright so that it is flush against the horizontal carrier, and during this procedure the vertical carrier is moved upwardly so that the vertical carrier, horizontal carrier and platform structure all lie parallel in a neat horizontal stack, which subsequently slides inwardly on the mounting plate, and then moves to the interior of the vehicle as the door to which the lift is mounted is closed.

Once inside the vehicle, the lift takes a minimum of space, and yet when deployed, it folds out into an ample platform having effective safety barriers and connecting ramps which is sturdy enough to support and lift the heaviest of wheelchair users.

DETAILED DESCRIPTION OF THE PREFERRED EMBODIMENT

Figure 1:
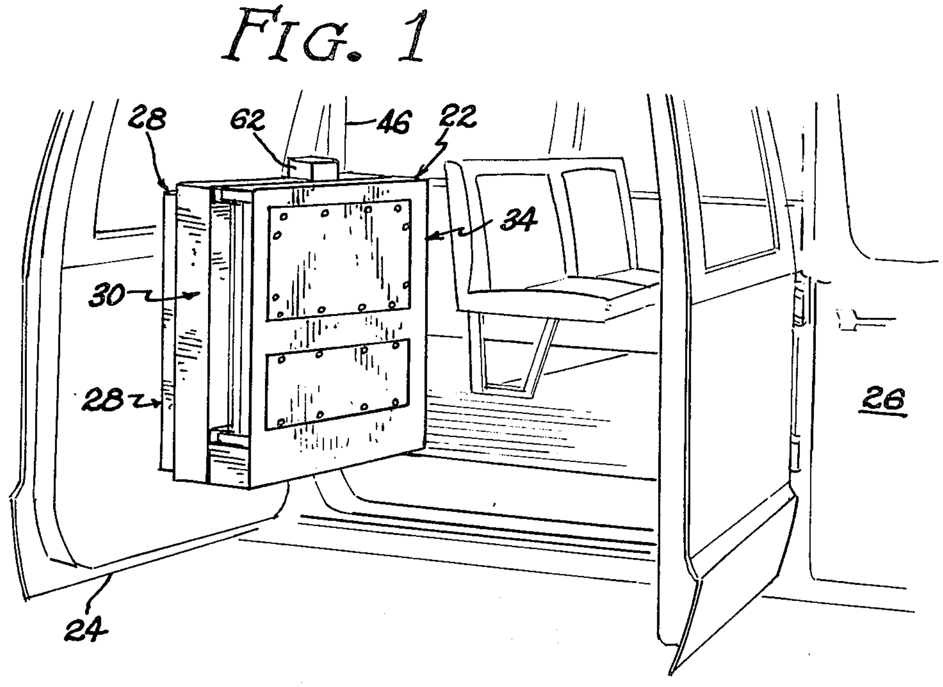
FIG. 1 is a perspective view of the lift in its compact mode mounted inside the side of a van.
Figure 2:
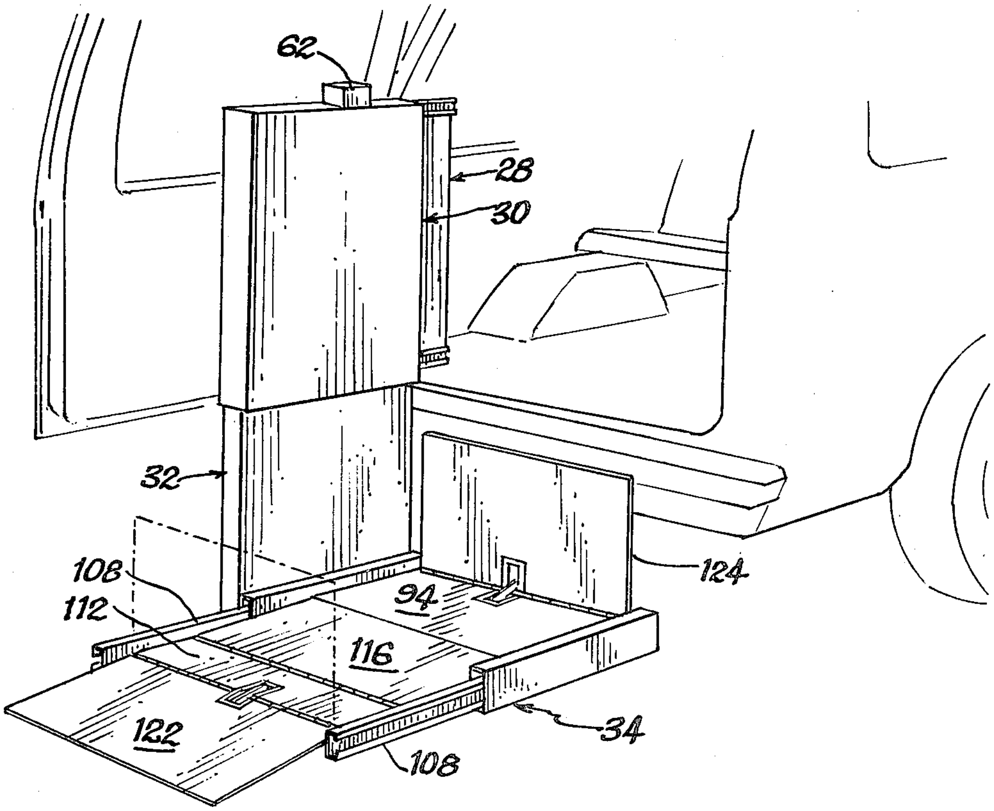
FIG. 2 is a perspective view of the lift as illustrated in FIG. 1 but mounted inside the rear door of a van in the deployed position at ground level.

The lift can be mounted in a motor home, in a stationary or mobile trailer, or in a van. The van mounting is most likely the most common implementation for the lift and the illustrations and description herein pertain to a van. In FIG. 1, the lift, generally indicated at 22, is shown in its compact position mounted against the door 24 of a van 26. The explanation of the structure and operation of the lift is most easily understood when it is broken into its four basic component parts which are illustrated in FIG. 2. These are the mounting plate 28 which connects to the vehicle structure, the horizontal carrier 30 which slides horizontally on the mounting plate 28 to translate the structure clear of the vehicle bumper, vertical carrier 32 which telescopes within the housing of the horizontal carrier 30 and rides up and down, and, lastly, the platform structure itself indicated at 34, which pivots from the upright position in the compact mode shown in FIG. 1 into the horizontal deployed position shown in FIG. 2. When deployed, the platform has rather involved interior structure that extends out from the platform during operation of the lift as will be described in detail below.

Figure 11:
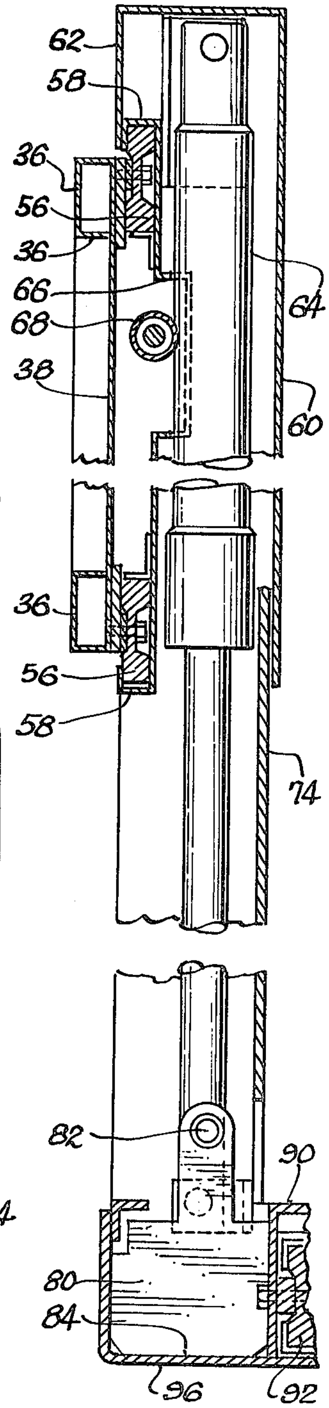
FIG. 11 is a section taken along line 11—11 of FIG. 7.
Figure 10:
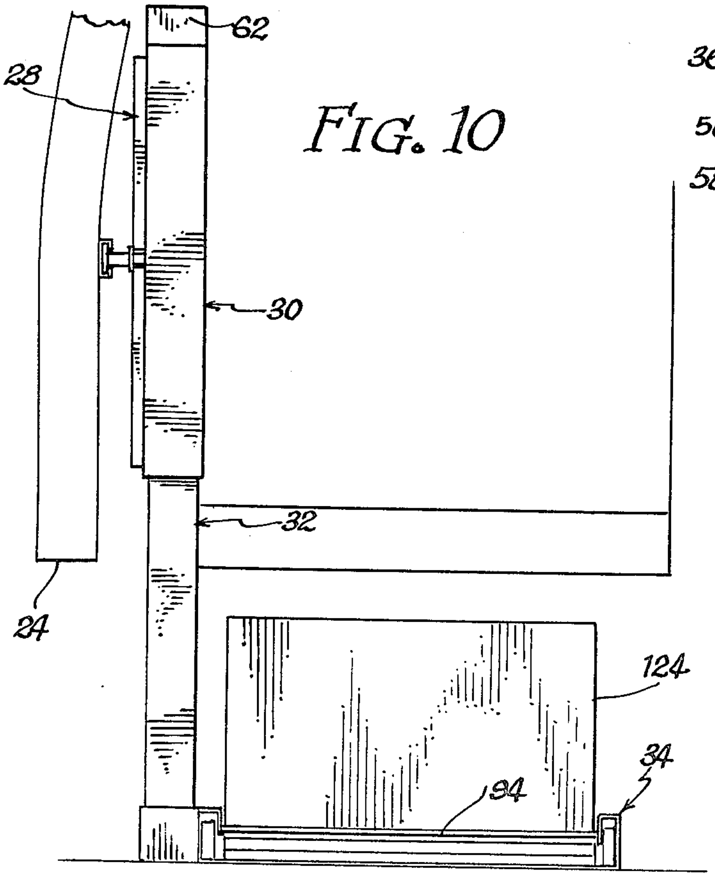
FIG. 10 is a diagrammatic detail illustrating the vertical movement of the platform once deployed.
Figure 13:
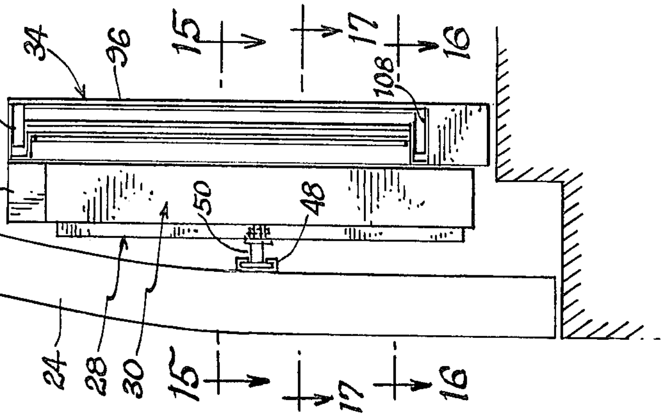
FIG. 13 is a vertical elevation view of the end of the lift taken on line 13—13 of FIG. 3.
Figures 14, 15, 16:
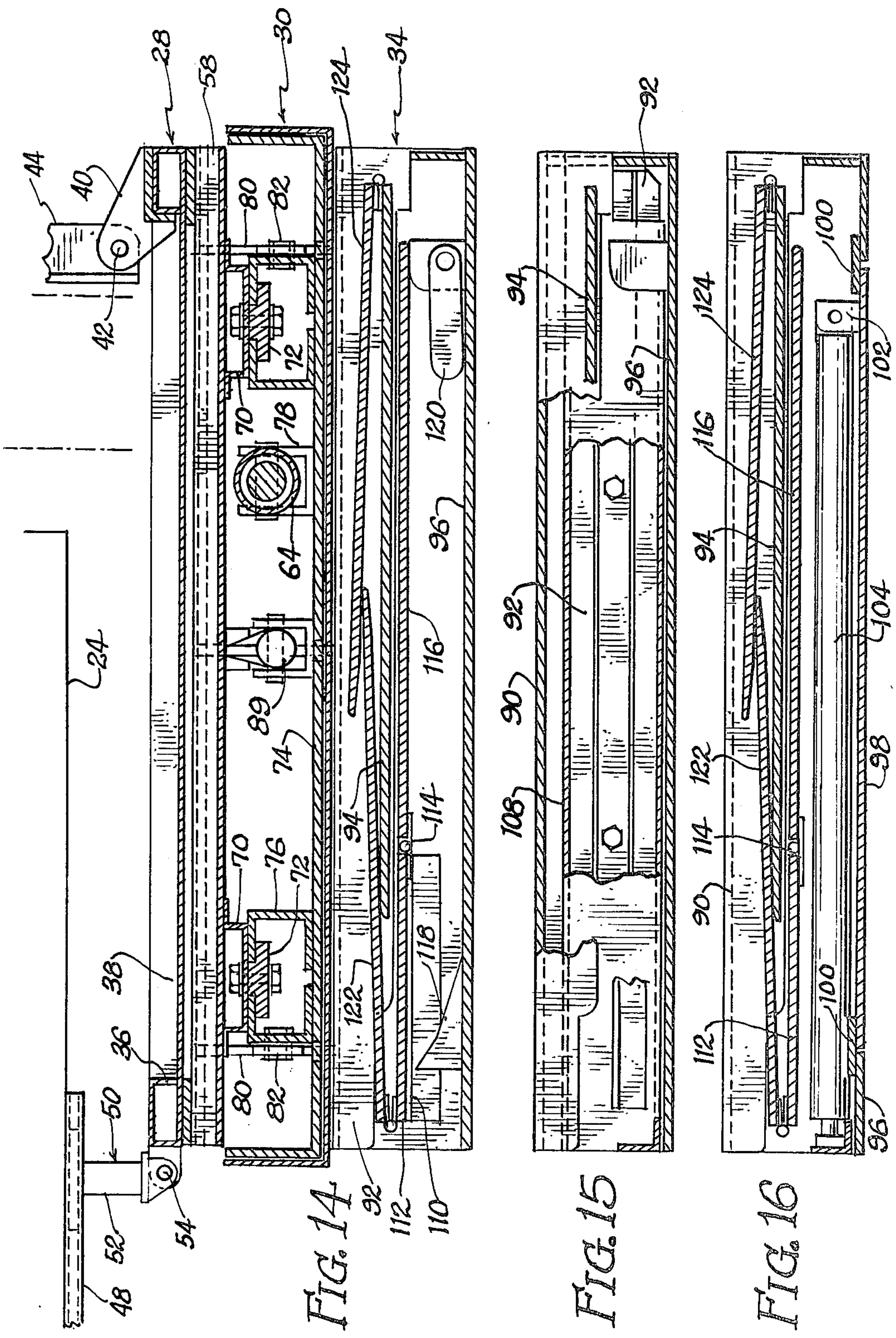
FIG. 14 is a section taken along line 14—14 of FIG. 7.
FIG. 15 is a longitudinal section of the platform structure taken on line 15—15 of FIG. 9 with portions cut away.
FIG. 16 is a longitudinal section taken on line 16—16 of FIG. 9 through the platform structure illustrating the folding of the ramp and the flap above the platform panel.

Taking these basic elements in order, the mounting plate 28 is best shown in FIGS. 11 and 14 and includes a peripheral box channel frame 36 and a front plate element 34. The edge of the mounting plate closest to the van has a number of webs 40 mounted to it, and these webs define a hinge 42 with gussets 44, best seen in FIGS. 5 and 14, which are welded to door post 46, shown in FIGS. 1 and 2.

As can be seen in FIG. 14, the door 24 of the van is also hinged to the door posts 46, but is not coaxial with the hinge 42, but is rather hinged on an axis parallel and spaced from hinge 42.

For this reason, when the door is opened, the lift mechanism will not follow the door perfectly, and a channel 48 must be retrofitted horizontally onto the door as shown in FIG. 14. In this channel a rider 50 rides, with a slide 52 actually being engaged in the channel and a knuckle 54 being welded to the opposite edge of the mounting plate from the hinge 42.

Figure 3:
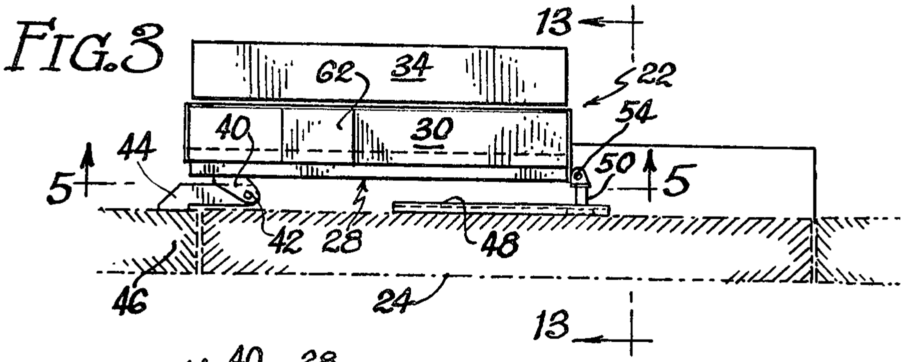
FIG. 3 is a top elevation view of the unit as shown in FIG. 1, but with the door closed.
Figure 4:
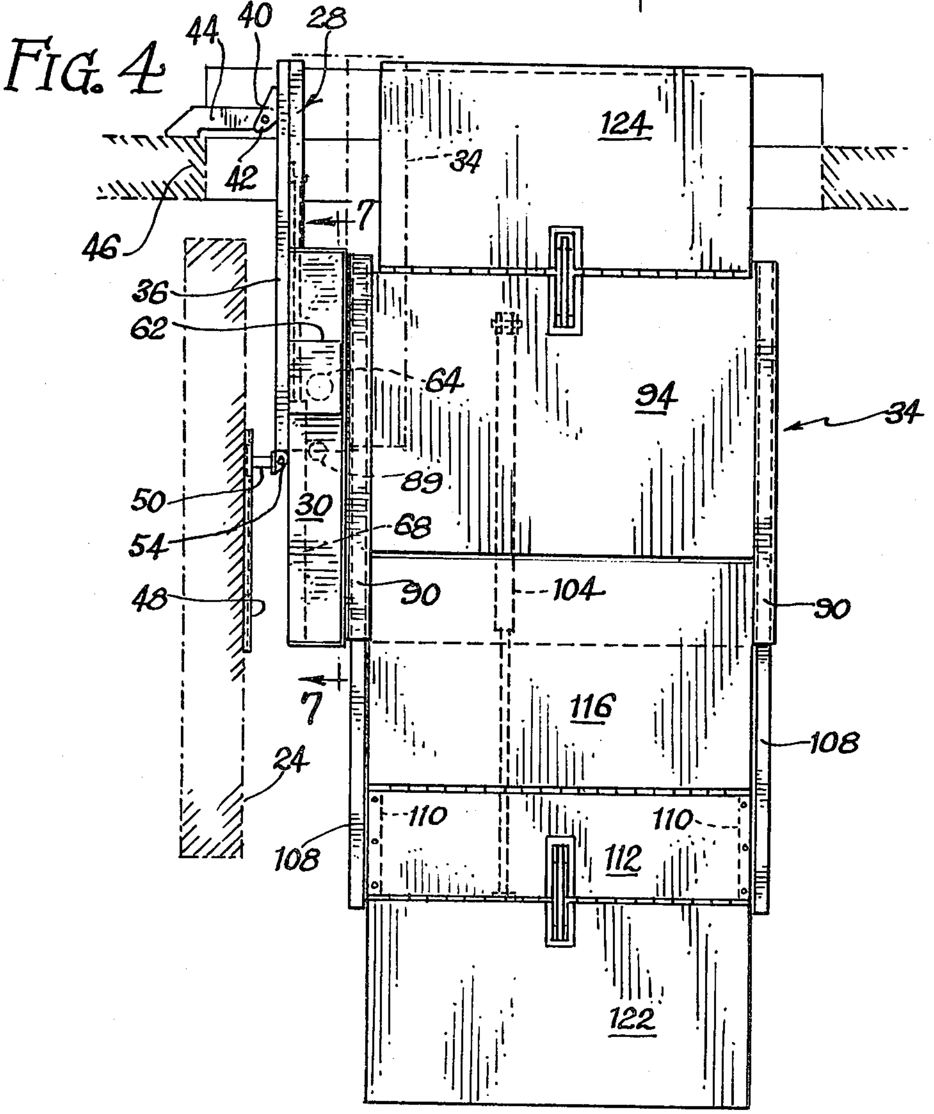
FIG. 4 is a top elevation view of the unit deployed as shown in FIG. 2.
Figure 5:
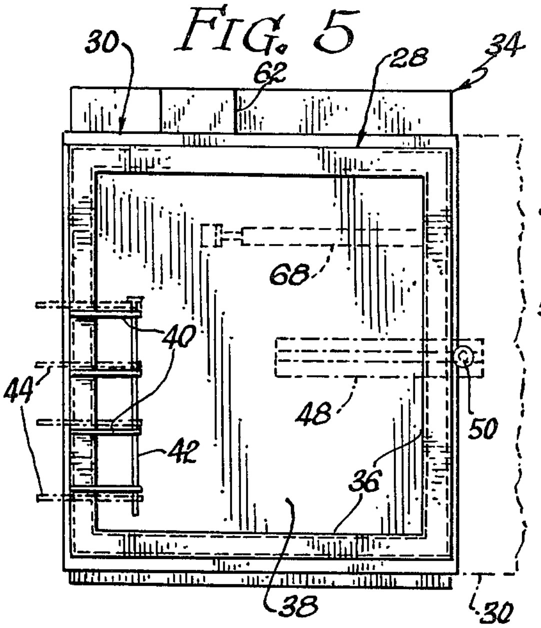
FIG. 5 is an elevation view taken along line 5—5 of FIG. 3.

The simple action of the door and lift apparatus can be seen from the diagrammatic illustrations in FIGS. 3 and 4. In FIG. 3, the lift is in its compact mode, is also in its stowed mode, with the door to the van being shut and the lift mechanism on the inside. In FIG. 4, the door has been opened, and it can be seen that the rider 50 rides toward the hinge of the door as shown in FIG. 4 as the latter is opened. The mounting plate bears the entire weight of the lift, and as can be seen from FIGS. 5 and 4, the hinge 40 absorbs all torques and stresses other than a downward vector which is delivered to the van door through the slide. The rugged, multiple contact hinge structure is shown in FIG. 5.

Figure 8:
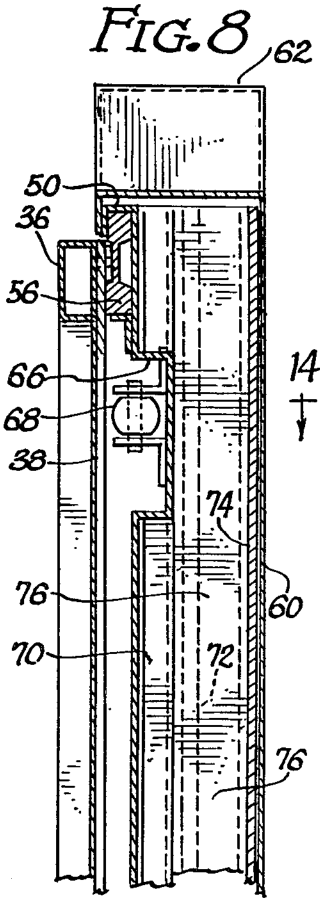
FIG. 8 is a section taken along line 8—8 of FIG. 7.

The outer surface of the mounting plate mounts a pair of horizontal, spaced rails 56, as can be seen in FIGS. 14, 11, and especially FIG. 8. It is on these rails that the horizontal carrier moves, engaging the rails with tracks 58 which wrap around the rails as shown in FIGS. 8 and 11 to define a positive engagement. The metal-to-metal sliding construction used throughout the lift is fairly low in friction, and yet is of course much more durable than any type of roller action. As seen in FIG. 11, the horizontal carrier has a housing or cover member 60 which wraps over the top and down the front of the lift structure and defines a rectangular mounting box 62 which pivotally mounts the upper end of the vertical actuator cylinder 64. The horizontal carrier also has a wide clearance groove 66 which is horizontally extended to clear the horizontal extension cylinder 68, which can best be seen in FIG. 4 as connecting at the respective ends to a mounting point on the mounting plate, and to the outer end of the horizontal carrier.

As shown in FIG. 14, the front face of the horizontal carrier mounts a pair of parallel, vertical brackets 70 which in turn mount vertical rails 72. The lower end of the vertical actuator cylinder 64 connects to the bottom end of the vertical carrier. The horizontal carrier can thus be seen as simply a vertical-to-horizontal interface, with the back surface having a pair of horizontal tracks and a horizontal actuator which interfaces with the mounting plate, and the front face having a pair of vertical rails and a vertical lift cyinder, which interfaces with the vertical carrier.

The vertical carrier 32 has a structured cover 74 similar in shape to the cover 60 of the horizontal carrier, but is made of heavy gauge steel and is of slightly smaller dimension so that it nests or telescopes inside the horizontally carrier cover as shown in FIG. 14. The vertical carrier defines tracks 76 which engage the rails 72 and is basically nothing more than the structural vertical slide or cover 74 which has wrap-around sides. The vertical lift cylinder 64 connects to the vertical carrier at the bracket 78 shown in FIG. 14.

Figure 7:
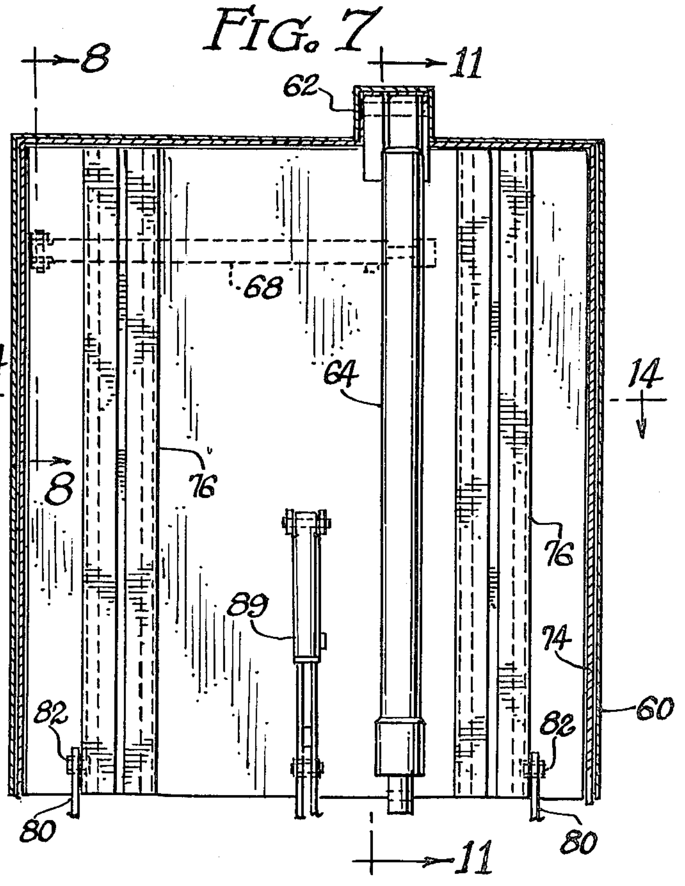
FIG. 7 is a section view taken on line 7—7 of FIG. 4 through the horizontal and vertical carrier of the unit.
Figure 9:
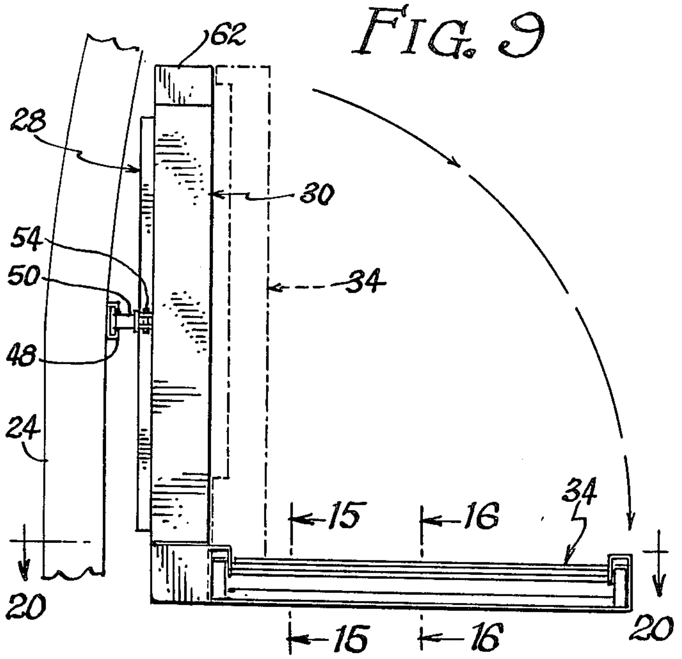
FIG. 9 is a detail diagrammatically illustrating the pivotal motion of the platform structure.

At the bottom of the track members 76 a pair of gussets 80 are pivoted at 82. These gussets extend down into, and are welded into, a channel 84 defined in the sheet metal at the inner end of the platform 34. The pivotal connection is best seen in FIG. 14, and an example of the gusset can be seen in FIG. 17. Clearances are provided such that the platform structure 34 can swing vertically upwardly on the pivots 82 to the upright position, or down into the horizontally extended position shown in FIG. 17. The drive for this action is provided by a rack 86 which rotates spur gear 88, shown as being part of one of the gussets 80. An electric or hydraulic motor, or a cylinder such as cylinder 89 shown in FIG. 7, drives the rack.

Figure 6:
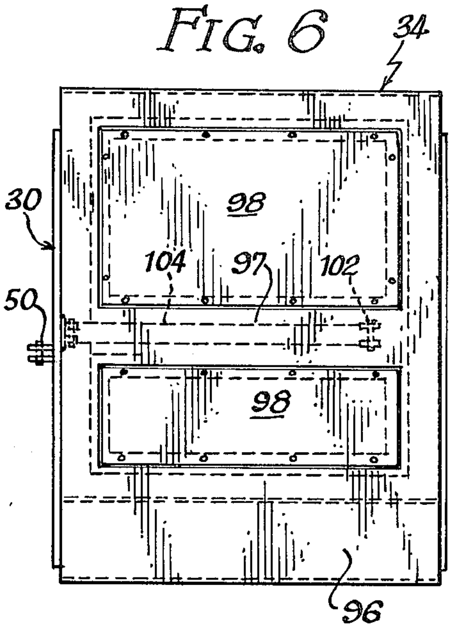
FIG. 6 is an elevation view of the unit in its compact mode as seen from the opposite side of the door, with certain interior structure in phantom.
Figure 17:
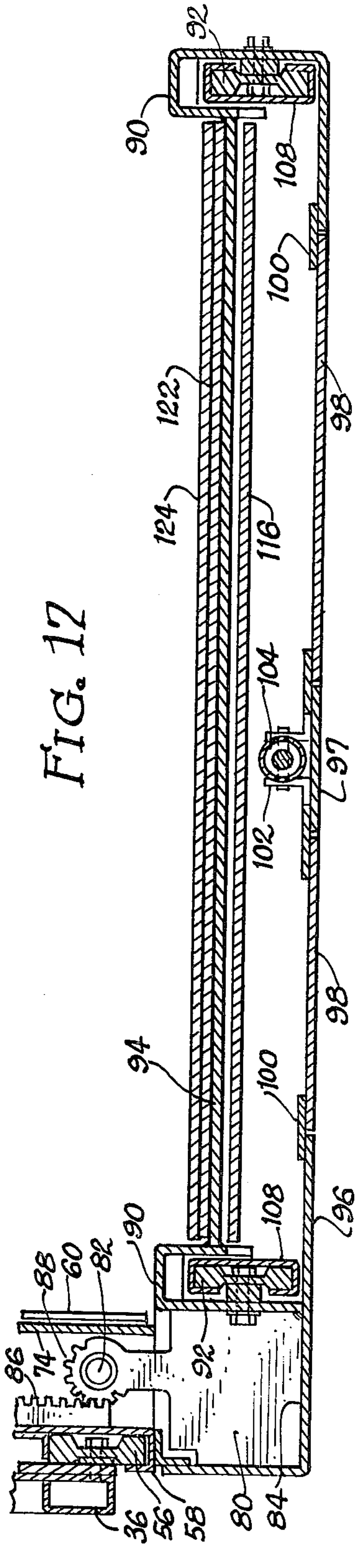
FIG. 17 is a vertical section taken through the platform structure laterally.
Figure 18:
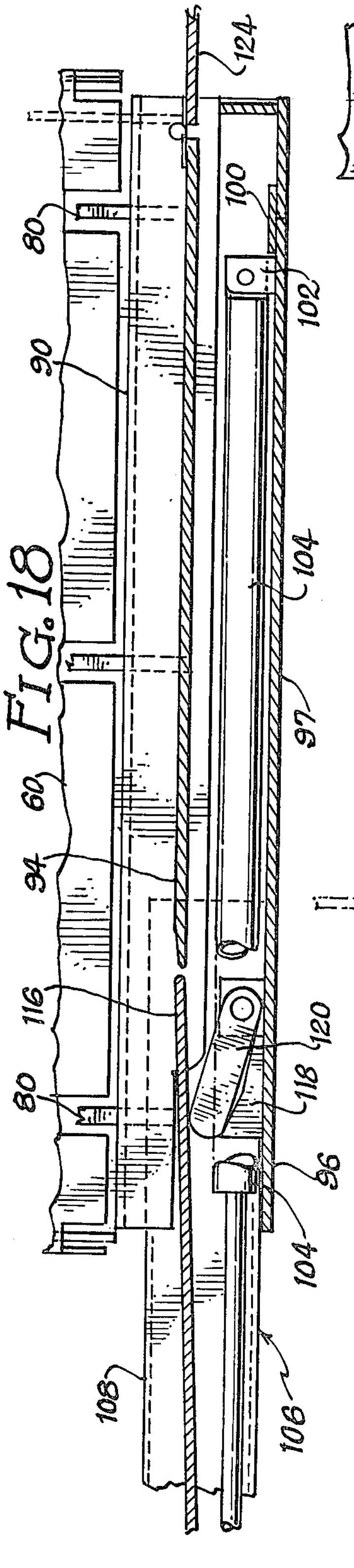
FIG. 18 is a vertical section taken longitudinally through a portion of the platform structure as it appears in its extended mode.

The structure of the platform itself is fairly simple and can be understood by simultaneous reference to FIGS. 17 and 18. A pair of sidewalls 90 mount spaced, parallel rails 92, and extend up and over the rails to rigidly mount the platform panel 94. The bottom portion of the platform apparatus defines a skid plate 96, which is not actually solid, but has a pair of side-by-side access openings separated by a longitudinal band 97 shown in FIG. 6 and covered by cover plates 98 and maintained in place by an overlapping rectangular member 100 attached to the skid plate. This structure is best shown in FIG. 6.

Toward the rear end of the skid plate and on the band 97 a mounting bracket 102, shown in FIGS. 17 and 18, mounts the rear end of platform extension cylinder 104. The forward end of this cylinder mounts to the forward edge of the platform extension apparatus 106, whose basic function it is to slide forwardly, underneath the platform panel, to define an extension of the platform surface.

Figure 19:
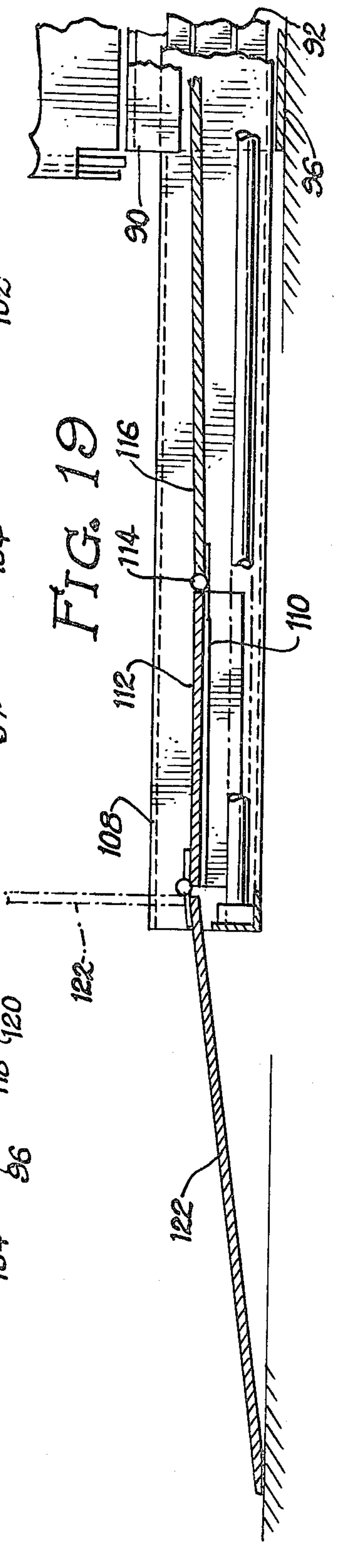
FIG. 19, a continuation of FIG. 18, is another vertical section taken longitudinally through a portion of the platform structure which includes the ramp in its deployed mode.

The extension is actually made of a frame having tracks 108 that track the rails 92 of the platform structure. As shown in FIG. 19, the forward portion of these tracks mount on their insides short lengths of angle iron 110, which define mounting strips for the platform extension element 112, which is rigidly mounted to the angle irons, and thus to the platform extension assembly. This surface-defining panel is capable of no movement other than in and out as an integral part of the extension frame.

Figure 20:
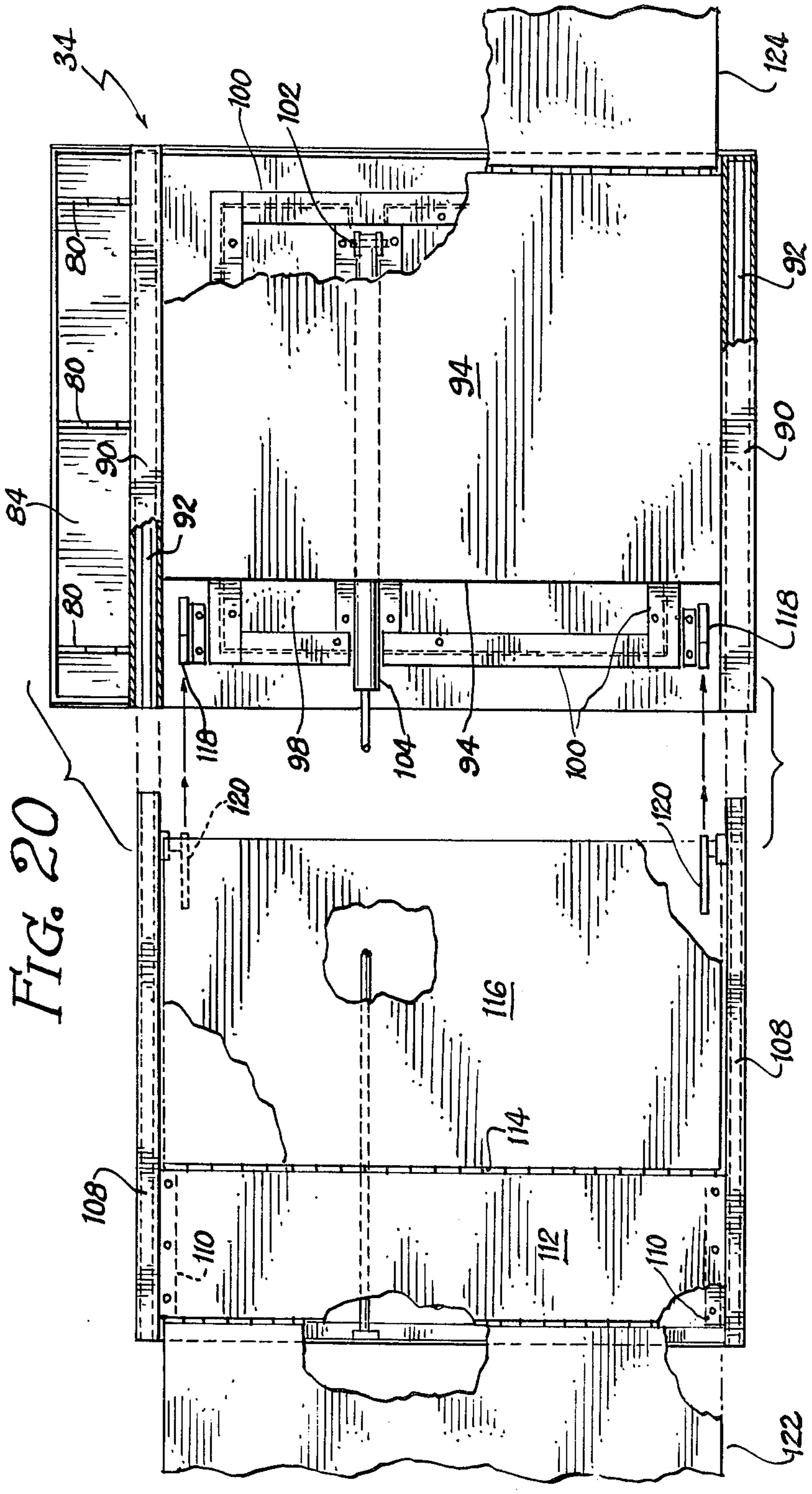
FIG. 20 is a plan view taken on line 20—20 of FIG. 9 with portions cut away of the platform enclosure structure and the platform extension structure illustrating how the extension structure fits into the frame of the platform structure.

Immediately behind this extension panel, however, is a hinge 114 which connects to a spanner panel 116, which is free at its rear end. The purpose of this spanner panel is to raise upwardly as shown in FIG. 18 until the rear edge achieves the same level as the forward edge of the fixed platform panel 94. This is accomplished by means of a pair of ramps 118 which are built into the sides of the platform structure 34, as shown in FIGS. 14 and 18, and perhaps best shown in FIG. 20. Onto these ramps ride pivoted cams 120 which are mounted to the platform extension apparatus 106. By simultaneous reference to FIGS. 20, 14 and 18, it can be seen that as the interior platform extension structure moves forwardly, these cams move from the position shown in FIG. 14 to the position shown in FIG. 18 in which they ride up on the ramps 118, forcing the rear portion of the spanner panel 116 into the position shown in FIG. 18.

Figure 12:
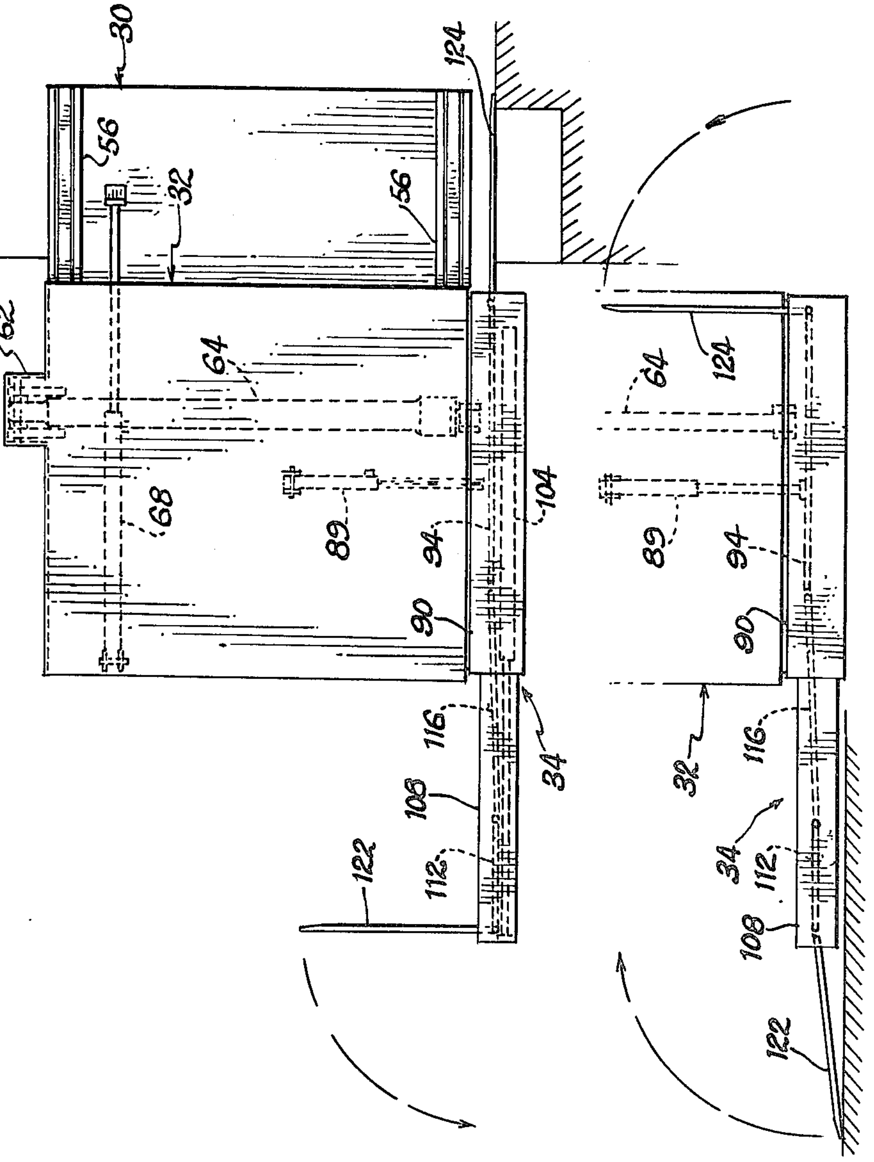
FIG. 12 is a diagrammatic illustration of the vertical action and the flap and ramp pivoting action of the device in use.

There are two other panel members which constitute part of the lift, which are shown somewhat diagrammatically, as their actuating mechanism is detailed and the prior patents and patent applications referenced in the Background. These papers are hereby incorporated by reference. The panels constitute a front ramp 122 which is pivoted to the front edge of the platform extension element 112, and a rear flap 124, which is pivoted to the rear edge of the platform panel 94. Both of these panels act alternately as a safety barrier and as a spanner panel connecting the platform to the respective surface of the vehicle or the ground or sidewalk. Both of these panels must be in their upright, barrier position before the platform will move up or down. Once the lift is in the up position, the rear flap swings back on its hinge to connect with the van floor as shown in FIG. 12, and when in the lowered position the ramp 122 drops to extend the platform to ground level. The safety mechanisms for these barriers, as well as the hydraulic sequencing and powering structure, do not form part of the invention per se, and are more on the order of engineering implementations of the overall concept which have been omitted in the name of brevity.

Because of its unique multiple folding action, the platform and platform extension assembly actually expand into a fairly large operative area from a fairly compact package. Because of the nature of the folding, the vertical dimension of the platform in its upright position (stowage position) is the dimension that need be sufficiently large to accommodate the lateral spacing of wheelchair wheels, with adequate clearance on both sides. This dimension is not critical in the stowage mode as can be seen in FIGS. 1 and 2, as additional vertical height is not critical. When folded down as shown in FIG. 2, however, the depth needed for the wheelchair is easily accommodated by the platform extension mechanism. The apparatus is thus ideally suited for vans and the like, where space is at a premium, where retrofitting should ideally be made simple so that smaller budgets can be accommodated, and where from the exterior there is no visible indication that the vehicle is adapted for wheelchair usage.

While the preferred embodiment of the invention has been described, other modifications may be made thereto and other embodiments may be devised within the spirit of the invention and scope of the appended claims.

What is claimed is:

1. A lift mechanism operable between a stowed mode and a deployed mode in which a platform is defined having means to selectably position same at a lower level and at an upper level, said lift mechanism comprising:

a platform;

a vertical carrier mounting said platform and being operable to raise and lower same to and between said levels;

a swivel support mechanism hinged on a horizontal axis to permit the pivoting of said platform between said stowed mode and said deployed mode; and wherein:

said lift mechanism is mounted in a doorway which separates an interior space from an exterior space;

said doorway has an upright door post and a door vertically hinged thereon;

said swivel support mechanism is hingedly mounted on a vertical axis to said door post such that said platform is pivotal between said stowed position in which said platform is in said interior space permitting said door to close, and said deployed position in which said platform is in said exterior space; and said door mounts a horizontal track and said swivel support mechanism includes a rider slidably supported in said track for support at a position on said support mechanism spaced from the pivotal axis thereof.

2. Structure according to claim 1 wherein said support mechanism includes a mounting plate mounting said vertical axis hinge and said rider which rides in said track, and said mounting plate horizontally movably mounts a horizontal carrier which mounts said vertical carrier, whereby said door can be opened to draw said lift mechanism therewith, said horizontal carrier then being operated to move toward the distal edge of said door, and said vertical carrier then lowered or raised at will to move said platform between said upper and lower level.

3. A lift mechanism operable between a compact mode and a deployed mode comprising:

a platform;

a vertical carrier a lower portion of which defines a horizontal axis hinge with one edge of said platform;

means vertically movably mounting said carrier;

means for pivoting said platform on said hinge from a generally horizontally extended mode to a vertical mode;

means for selectably elevating and lowering said vertical carrier between an upper level and a lower level, whereby said platform can be deployed horizontally for use and raised and lowered on said vertical carrier to move an object or a person between said upper and lower level or alternatively swung upwardly on said hinge into a compact position for stowage;

wherein said vertical carrier telescopes inside a horizontal carrier, and said platform, horizontal carrier and vertical carrier are of substantially the same platform dimensions and overlap one another to define a compact package in said compact mode when said platform is in its vertical position and said vertical carrier is raised inside said horizontal carrier; and including a mounting plate horizontally slidably mounting said horizontal carrier and said plate is pivoted in a doorway on a vertical axis to permit swinging said lift mechanism from said compact mode to a stowed mode inside said doorway.

4. Structure according to claim 3 wherein said means for pivoting comprises a spur gear fixed to said platform coaxially with said hinge and a rack engaging said spur gear and being driven from within said vertical carrier.

5. Structure according to claim 3 wherein said vertical carrier is received when raised inside a horizontal carrier and said means for selectably elevating and lowering said platform comprises a hydraulic cylinder vertically operative between said horizontal and vertical carrier.

6. A lift mechanism comprising:

a platform defining a platform panel;

a platform extension slidably mounted beneath said panel and having means to slide same forwardly from beneath said panel to define an extension thereof;

means for selectably moving said platform between an upper level and a lower level;

wherein said platform defines an open frame with a lower skid plate spaced below said platform panel and said extension slides between said plate and panel;

and including a ramp horizontally hinged to the forward edge of said extension and being pivoted between a ramp mode sloping from said extension to an adjacent surface, to an upright mode acting as a barrier at the forward edge of said extension;

said platform has a rear flap horizontally hinged to the rear edge thereof and including means for pivoting said rear flap between an upright barrier position to a generally horizontally extended position at said upper level to span from said platform to an adjacent surface at said upper level; and wherein said ramp and flap also pivot on their respective hinges into a folded mode over said panel when said extension is not extended.

7. Structure according to claim 6 wherein said panel is hinged along one side edge to a vertical carrier and including means for pivoting same upwardly into an upright position when said flat and ramp are in their folded mode.

8. Structure according to claim 7 and including means for sliding said platform and vertical carrier rearwardly when said platform is in the upright position at said upper level, and further including hinge means for permitting the rearward pivoting of said lift mechanism into a stowed mode.

* * * * *